US010491648B2

(12) United States Patent
Levy

(10) Patent No.: US 10,491,648 B2
(45) Date of Patent: Nov. 26, 2019

(54) SERVER-SIDE INTERSTITIAL CONTENT INSERTION

(71) Applicant: Cisco Technology, Inc., San Jose, CA (US)

(72) Inventor: Thomas Levy, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 225 days.

(21) Appl. No.: 15/593,482

(22) Filed: May 12, 2017

(65) Prior Publication Data

US 2017/0331872 A1    Nov. 16, 2017

Related U.S. Application Data

(60) Provisional application No. 62/335,955, filed on May 13, 2016.

(51) Int. Cl.
*G06F 15/16* (2006.01)
*H04L 29/06* (2006.01)

(52) U.S. Cl.
CPC ........ *H04L 65/602* (2013.01); *H04L 65/4084* (2013.01); *H04L 65/607* (2013.01)

(58) Field of Classification Search
CPC .. H04L 65/602; H04L 65/4084; H04L 65/607
USPC ........................................................ 709/219
See application file for complete search history.

(56) References Cited

U.S. PATENT DOCUMENTS

| 8,751,679 | B2* | 6/2014 | McHugh | H04N 21/23439 709/219 |
| 2010/0235468 | A1 | 9/2010 | Cobb et al. | |
| 2012/0158667 | A1* | 6/2012 | Raju | G06F 16/84 707/687 |
| 2014/0149210 | A1 | 5/2014 | Ma et al. | |
| 2014/0150019 | A1* | 5/2014 | Ma | G06Q 30/0251 725/34 |
| 2015/0288617 | A1* | 10/2015 | Dasher | H04L 47/801 709/226 |
| 2015/0334431 | A1* | 11/2015 | Bjordammen | H04N 21/2625 725/32 |

(Continued)

FOREIGN PATENT DOCUMENTS

WO    2015121708 A1    8/2015
WO    2015159244 A1    10/2015

*Primary Examiner* — Atta Khan
(74) *Attorney, Agent, or Firm* — Merchant & Gould P.C.

(57) ABSTRACT

A first manifest request may be received and, in response, a first manifest may be requested. Next, at least one interstitial content insertion source may be queried based on the first manifest and, in response to querying the interstitial content insertion source, interstitial content details may be retrieved from the at least one interstitial content insertion source. Then it may be determined that a version of interstitial content corresponding to the interstitial content details does not exist in a service provider back end at same bitrates as content corresponding to the first manifest. Next, local ingest and encoding of the interstitial content to the service provider back end may then be triggered in response to determining that the version of interstitial content corresponding to the interstitial content details does not exist in the service provider back end at the same bitrates as the content corresponding to the first manifest.

20 Claims, 3 Drawing Sheets

(56) References Cited

U.S. PATENT DOCUMENTS

2015/0371280 A1* 12/2015 Bjordammen ..... G06Q 30/0269
                                                    705/14.66
2018/0184132 A1*  6/2018 Mao ..................... H04N 21/222

* cited by examiner

SERVER-SIDE INTERSTITIAL CONTENT INSERTION

RELATED APPLICATION

Under provisions of 35 U.S.C. § 119(e), Applicants claim the benefit of U.S. Provisional Application No. 62/335,955 filed May 13, 2016, which is incorporated herein by reference.

TECHNICAL FIELD

The present disclosure relates generally to content insertion

BACKGROUND

Adaptive bitrate (ABR) streaming is a technique used in streaming multimedia over computer networks. While in the past most video streaming technologies utilized streaming protocols such as RTP with RTSP, today's adaptive streaming technologies are almost exclusively based on HTTP and designed to work efficiently over large distributed HTTP networks such as the Internet. Adaptive bitrate streaming works by detecting a user's bandwidth and CPU capacity in real time and adjusting the quality of a video stream accordingly. It requires the use of an encoder which can encode a single source video at multiple bit rates. The player client switches between streaming the different encodings depending on available resources.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
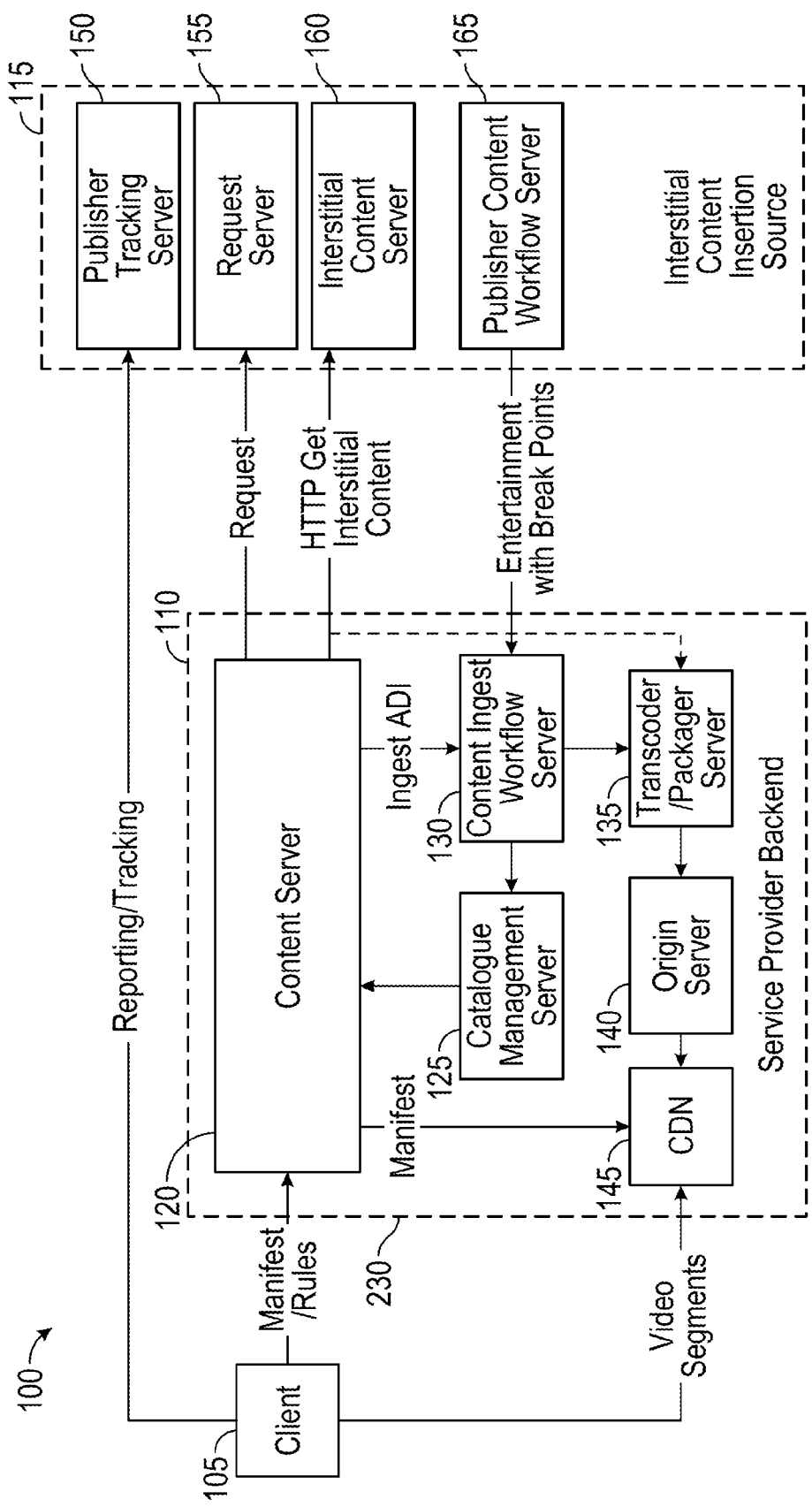
FIG. 1 is a block diagram of an interstitial content service system.

Interstitial content insertion may be provided. A first manifest request may be received and, in response, a first manifest may be requested. Next, at least one interstitial content insertion source may be queried based on the first manifest and, in response to querying the interstitial content insertion source, interstitial content details may be retrieved from the at least one interstitial content insertion source. Then it may be determined that a version of interstitial content corresponding to the interstitial content details does not exist in a service provider back end at same bitrates as content corresponding to the first manifest. Next, local ingest and encoding of the interstitial content to the service provider back end may then be triggered in response to determining that the version of interstitial content corresponding to the interstitial content details does not exist in the service provider back end at the same bitrates as the content corresponding to the first manifest.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Video Ad Serving Template (VAST) is a specification released by the Interactive Advertising Bureau (IAB) that allows a video player (i.e., a client) to retrieve interstitial content from one (or more) interstitial content servers. Because the video player directly may retrieve the interstitial content, a user experience may result that suffers from delay and buffering during the playback of the video content. This may be accepted when playing over-the-top content (OTT) services on web clients, however on managed devices (e.g., customer premises equipment (CPE), set-top boxes (STB), or other managed devices) such user experience may be more difficult to accept. This may be the case when comparing with the existing experience with pre-inserted interstitial content inside video content. Moreover, the rise in interstitial content blockers installed on web clients represents a threat to the VAST model. The ease with which requests handled at the video player level can be filtered threatens the basis of making decisions at the video player level that in turn is a serious challenge to the basis of the VAST model.

To mitigate the limitations from the conventional systems, embodiments of the disclosure may provide a server side component (e.g., a content server) that may act as a VAST client fronting the client device, and that merges the main video and the interstitial content returned from a VAST server (e.g., request server) into a single video stream. This approach combined with adaptive bitrate (ABR) delivery (e.g., HLS or DASH) may provide the server side component that may manipulate a video manifest to insert interstitial content without having to manipulate the video segments. This may allow the ability to introduce a VAST server side model in a smooth way. While example embodiments of the disclosure may include the interstitial content comprising, for example, advertisements, embodiments of the disclosure are not so limited and may include any type interstitial content.

FIG. 1 is a block diagram of an interstitial content service system 100 consistent with embodiments of the disclosure. As shown in FIG. 1, interstitial content service system may comprise a client 105, a service provider backend 110, and an interstitial content insertion source 115. Client 105 may comprise, but is not limited to, a cellular base station, a tablet device, a mobile device, a smart phone, a telephone, a remote control device, a set-top box, a digital video recorder, a cable modem, a personal computer, a network computer, a mainframe, a router, or other similar microcomputer-based device.

Service provider backend 110 may comprise a content server 120, a catalogue management server 125, a content ingest workflow server 130, a transcoder/pager server 135, an origin server 140, and a content delivery network (CDN) 145. Interstitial content insertion source 115 may comprise a publisher tracker server 150, a request server 155, an interstitial content server 160, and a publisher content workflow server 165.

For content that an interstitial content (e.g., VAST interstitial content) insertion is requested, content server 120 may be configured as an HTTP proxy that may process incoming manifest HTTP requests. The use of content server 120 rather than requesting the manifest directly from CDN 145 can be based on the content provider or any other criteria related to the entertainment content (e.g., entertainment content).

When receiving a manifest request, content server 120 may query the manifest from CDN 145. It may then determine whether an interstitial content opportunity is applicable, for example, as pre/mid or post roll for this content. Based on this determination, content server 120 may issue one (or more) request to an appropriate interstitial content server (e.g., interstitial content server 160). From the response, content server 120 may retrieve the interstitial content (e.g., linear interstitial content). For example, only the interstitial content may be inserted inside the content. For each linear interstitial content, content server 120 may check whether a version of this interstitial content exists in service provider backend 110 that is available with the same bitrates as the content. If not already available, content server 120 may trigger the local ingest and encoding of the interstitial content. For instance, this can be done by building a related Asset Distribution Interface (ADI) file that may be issued to the usual content ingest workflow of the service provider. The local encoding of the interstitial content might take a few seconds, for example, depending on the interstitial content's duration. Embodiments of the disclosure may not delay the delivery of the content until the interstitial content is locally encoded. Thus, interstitial content returned for the first time may not be filled, but it may be inserted the next time there is a response with this interstitial content.

For the linear interstitial content locally available on CDN 145 of service provider backend 110, content server 120 may aggregate segments corresponding to the interstitial content into a single manifest corresponding to the requested content. As a result, client 105 may display the video with its interstitial content as a single video content.

For the tracking of events related to the interstitial content (e.g., the start of viewing), there may be at least options: 1) either the tracking may be performed at the server side by content server 120; or 2) the tracking may be performed at the client side. The point with tracking at the server side is that with ABR delivery, the network may have limited knowledge about the client viewing. In case a limited number of tracking events are required (e.g., start viewing and completed viewing), a server side session control element may determine the start (and end) of viewing of a given interstitial content. Embodiments of the disclosure may provide that client 105 keep triggering the tracking at the exact interstitial content viewing event. This latter option may require that the tracking event URLs may be passed to client 105. This may be done by passing a part of the response into rules that may be used by client 105 to trigger tracking events.

Embodiments of the disclosure may combine ABR manifest manipulation with interstitial content insertion (e.g., VAST interstitial content insertion) services provided by an external interstitial content provider in a way to provide improved user experience and reduce chance of interstitial content blocking for the subscribers of a service provider.

Figure 2:
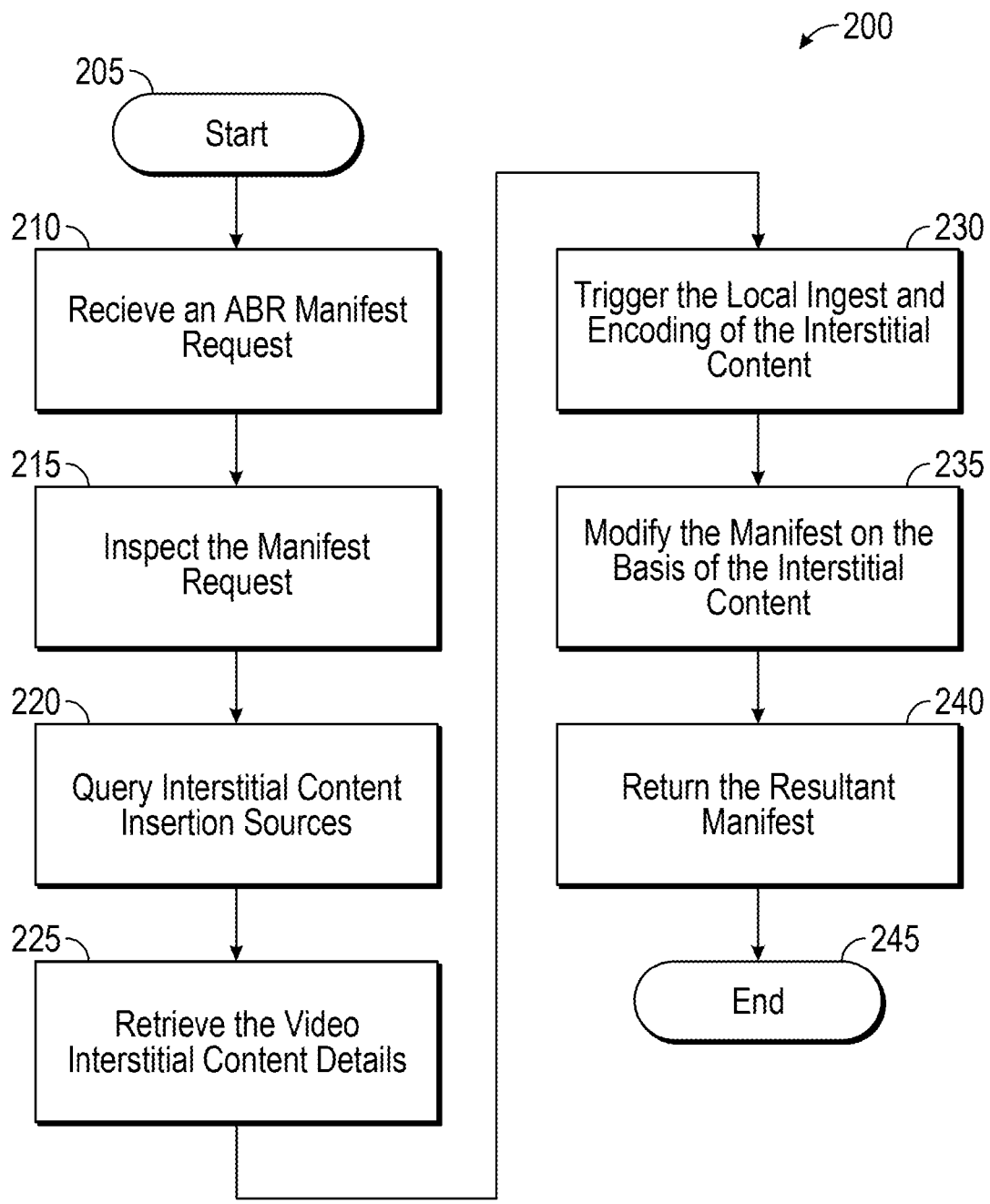
FIG. 2 is a flow chart of a method providing interstitial content insertion.

FIG. 2 is a flow chart setting forth the general stages involved in a method 200 consistent with an embodiment of the disclosure for providing interstitial content insertion. Method 200 may be implemented using content server 120 described above with respect to FIG. 1. A computing device 300 as described in more detail below with respect to FIG. 3 may comprise an operating environment for content server 120 as well as for other components of interstitial content service system 100 of FIG. 1. Ways to implement the stages of method 200 will be described in greater detail below.

First, content server 120 may receive a manifest request (e.g., an ABR manifest request) from an ABR client (e.g., client 105) and in turn request the manifest from a source or CDN 145. (Stage 210.) Then content server 120 may inspect the manifest request to identify content. (Stage 215.) Content server 120 may then query interstitial content insertion source 115, for example, using VAST to an external interstitial content provider. (Stage 220.)

From an interstitial content insertion response to the query, content server 120 may retrieve video advert details (i.e., interstitial content details) and may check whether a version of this video interstitial content exists in service provider backend 110 (e.g., in CDN 145) at the same bitrates as the content. (Stage 225.) Next, for each interstitial content, if the interstitial content is present, content server 120 may add the advert to the list of adverts to be inserted in the manifest. If the interstitial content is not present, content server 120 may trigger the local ingest and encoding of the interstitial content. (Stage 230.) For instance, this can be done by building a related ADI file that may be issued to the usual automatic content ingest workflow of the service provider.

Next, content server 120 may modify the manifest on the basis of the adverts in CDN 145, using the appropriate CDN content sources. (Stage 235.) This may be done without waiting for the ingest of the interstitial content in the second list from stage 230 to complete as the local encoding of the interstitial content might take few seconds, for example, depending on the interstitial content duration. A consequence of this may be that the first time an interstitial content is returned by interstitial content insertion source 115, it may not be placed into the manifest, but it may be inserted the next time there is a response with this interstitial content. Content server 120 may then return the resultant manifest. (Stage 240.)

As a result, embodiments of the disclosure may provide automatic triggering of ingest and encoding of the interstitial content into the local CDN of the service provider, filtering the candidate list for insertion into the manifest for adverts that may meet CDN QoS (and to overcome latency during interstitial content ingest), ensuring commonality of references to adverts with references to content. Method 200 may then end. (Stage 245).

Embodiments of the disclosure may provide a server side component (e.g., content server 120) that may provide VAST server-side interstitial content insertion combined with ABR manifest manipulation. Embodiments of the disclosure may deliver ABR content with interstitial content coming from an external interstitial content provider as a single content delivered with the quality of a delivery being made by the main video service provider.

Figure 3:
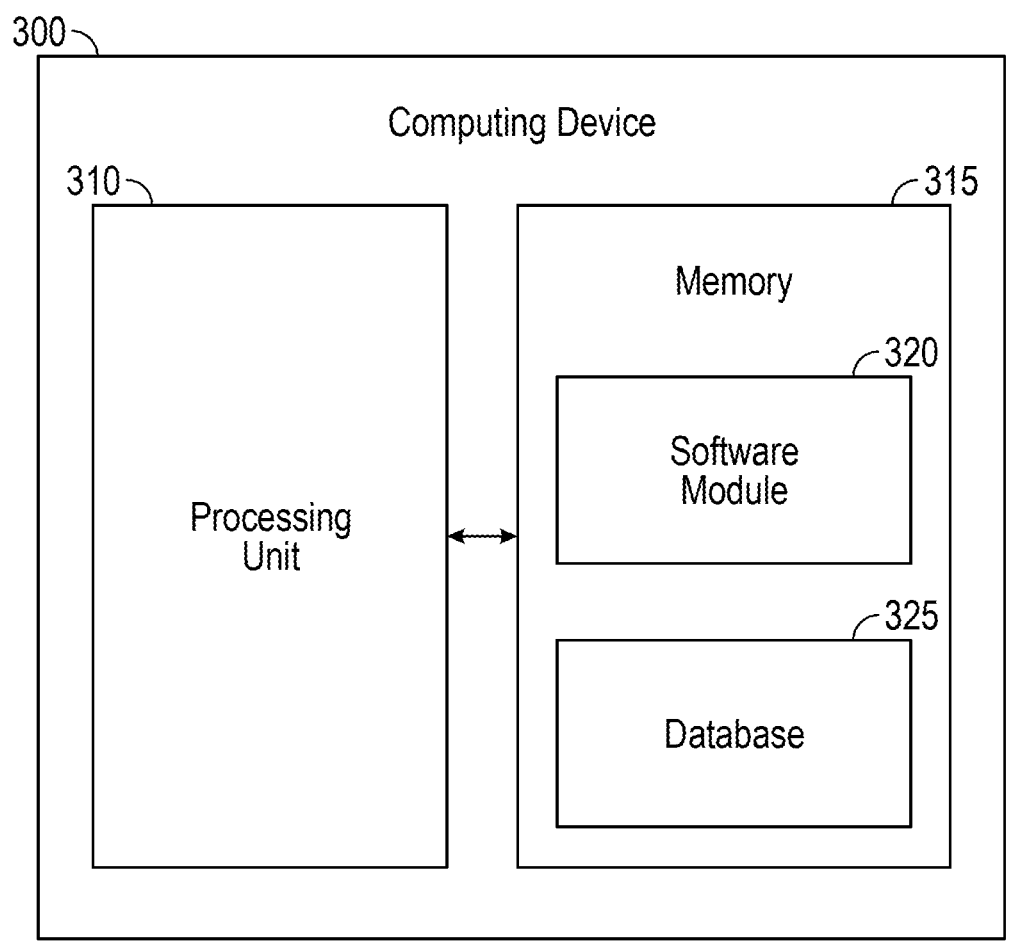
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform processes for providing interstitial content insertion, including for example, any one or more of the stages from method 200 described above with respect to FIG. 2. Computing device 300, for example, may provide an operating environment for client 105, content server 120, or any other server included in interstitial content service system 100 of FIG. 1. Client 105, content server 120, or any other server included in interstitial content service system 100 may operate in other environments and are not limited to computing device 300.

Computing device 300 may be implemented using a personal computer, a network computer, a mainframe, a router, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components, devices, or servers illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving a first manifest request;
   requesting, in response to receiving the first manifest request, a first manifest;
   querying at least one interstitial content insertion source based on the first manifest;
   retrieving, in response to querying the at least one interstitial content insertion source, interstitial content details from the at least one interstitial content insertion source;

determining that a version of interstitial content corresponding to the interstitial content details does not exist in a service provider back end at same bitrates as content corresponding to the first manifest; and
triggering local ingest and encoding of the interstitial content to the service provider back end in response to determining that the version of interstitial content corresponding to the interstitial content details does not exist in the service provider back end at the same bitrates as the content corresponding to the first manifest, wherein triggering the local ingest and encoding of the interstitial content to the service provider back end comprises:
building a related Asset Distribution Interface (ADI) file; and
issuing the built ADI file to a content ingest workflow of the service provider.

2. The method of claim 1, further comprising:
receiving a second manifest request;
requesting, in response to receiving the second manifest request, a second manifest;
querying the at least one interstitial content insertion source based on the second manifest;
retrieving, in response to querying the at least one interstitial content insertion source, the interstitial content details from the at least one interstitial content insertion source;
determining that the version of the interstitial content corresponding to the interstitial content details exists in the service provider back end at the same bitrates as the content corresponding to the second manifest;
aggregating segments corresponding to the interstitial content into the second manifest; and
returning the aggregated second manifest.

3. The method of claim 1, wherein receiving the first manifest request comprises receiving the first manifest request comprising an adaptive (ABR) manifest request.

4. The method of claim 1, wherein receiving the first manifest request comprises receiving the first manifest request from a client.

5. The method of claim 1, wherein requesting the first manifest comprises requesting the first manifest from a content delivery network (CDN).

6. The method of claim 1, wherein querying the at least one interstitial content insertion source comprises:
inspecting the first manifest request to identify the content corresponding to the first manifest request; and
querying the at least one interstitial content insertion source based on the identified content.

7. A system comprising:
a memory storage; and
a processing unit coupled to the memory storage, wherein the processing unit is operative to:
receive a first manifest request;
request, in response to receiving the first manifest request, a first manifest;
query at least one interstitial content insertion source based on the first manifest;
retrieve, in response to querying the at least one interstitial content insertion source, interstitial content details from the at least one interstitial content insertion source;
determine that a version of interstitial content corresponding to the interstitial content details does not exist in a service provider back end at same bitrates as content corresponding to the first manifest; and
trigger local ingest and encoding of the interstitial content to the service provider back end in response to determining that the version of interstitial content corresponding to the interstitial content details does not exist in the service provider back end at the same bitrates as the content corresponding to the first manifest, wherein the processing unit being operative to trigger the local ingest and encoding of the interstitial content to the service provider back end comprises the processing unit being operative to:
build a related Asset Distribution Interface (ADI) file; and
issue the built ADI file to a content ingest workflow of the service provider.

8. The system of claim 7, wherein the processing unit is further operative to:
receive a second manifest request;
request, in response to receiving the second manifest request, a second manifest;
query the at least one interstitial content insertion source based on the second manifest;
retrieve, in response to querying the at least one interstitial content insertion source, the interstitial content details from the at least one interstitial content insertion source;
determine that the version of the interstitial content corresponding to the interstitial content details exists in the service provider back end at the same bitrates as the content corresponding to the second manifest;
aggregate segments corresponding to the interstitial content into the second manifest; and
return the aggregated second manifest.

9. The system of claim 7, wherein the first manifest request comprises an adaptive (ABR) manifest request.

10. The system of claim 7, wherein the processing unit being operative to receive the first manifest request comprises the processing unit being operative to receive the first manifest request from a client.

11. The system of claim 7, wherein the processing unit being operative to request the first manifest comprises the processing unit being operative to request the first manifest from a content delivery network (CDN).

12. The system of claim 7, wherein the processing unit being operative to query the at least one interstitial content insertion source comprises the processing unit being operative to:
inspect the first manifest request to identify the content corresponding to the first manifest request; and
query the at least one interstitial content insertion source based on the identified content.

13. A non-transitory computer-readable medium that stores a set of instructions which when executed perform a method executed by the set of instructions comprising:
receiving a first manifest request;
requesting, in response to receiving the first manifest request, a first manifest;
querying at least one interstitial content insertion source based on the first manifest;
retrieving, in response to querying the at least one interstitial content insertion source, interstitial content details from the at least one interstitial content insertion source;
determining that a version of interstitial content corresponding to the interstitial content details does not exist in a service provider back end at same bitrates as content corresponding to the first manifest; and triggering local ingest and encoding of the interstitial content to the service provider back end in response to determining that the version of interstitial content corresponding to the interstitial content details does not exist in the service provider back end at the same bitrates as the content corresponding to the first manifest, wherein triggering the local ingest and encoding of the interstitial content to the service provider back end comprises:

building a related Asset Distribution Interface (ADI) file; and issuing the built ADI file to a content ingest workflow of the service provider.

14. The non-transitory computer-readable medium of claim 13, further comprising:

receiving a second manifest request;

requesting, in response to receiving the second manifest request, a second manifest;

querying the at least one interstitial content insertion source based on the second manifest;

retrieving, in response to querying the at least one interstitial content insertion source, the interstitial content details from the at least one interstitial content insertion source;

determining that the version of the interstitial content corresponding to the interstitial content details exists in the service provider back end at the same bitrates as the content corresponding to the second manifest;

aggregating segments corresponding to the interstitial content into the second manifest; and returning the aggregated second manifest.

15. The non-transitory computer-readable medium of claim 13, wherein receiving the first manifest request comprises receiving the first manifest request comprising an adaptive (ABR) manifest request.

16. The non-transitory computer-readable medium of claim 13, wherein receiving the first manifest request comprises receiving the first manifest request from a client.

17. The non-transitory computer-readable medium of claim 13, wherein requesting the first manifest comprises requesting the first manifest from a content delivery network (CDN).

18. The non-transitory computer-readable medium of claim 13, wherein querying the at least one interstitial content insertion source comprises:

inspecting the first manifest request to identify the content corresponding to the first manifest request; and querying the at least one interstitial content insertion source based on the identified content.

19. The method of claim 1, not delaying the delivery of the interstitial content until the interstitial content is locally encoded.

20. The method of claim 1, further comprising enabling tracking of events associated with the interstitial content by a customer device associated with the first manifest request.

\* \* \* \* \*